United States Patent
Takada

[11] 3,860,745
[45] Jan. 14, 1975

[54] INFORMATION SELECTING AND DISPLAYING APPARATUS
[75] Inventor: Shohei Takada, Tokyo, Japan
[73] Assignee: Hitachi, Ltd., Tokyo, Japan
[22] Filed: Mar. 12, 1971
[21] Appl. No.: 123,746

[30] Foreign Application Priority Data
  Mar. 24, 1970   Japan.............................. 45-24591

[52] U.S. Cl................. 178/5.6, 178/5.8 R, 35/9 R, 35/9 E
[51] Int. Cl. ............................................. H04n 7/08
[58] Field of Search.......... 178/5.6, 5.8 R, DIG. 22, 178/DIG. 35, 6; 35/9, 8 R

[56] References Cited
UNITED STATES PATENTS

| | | | |
|---|---|---|---|
| 2,696,523 | 12/1954 | Theile | 178/6.5 |
| 3,050,579 | 8/1962 | Nash et al. | 178/DIG. 22 |
| 3,098,119 | 7/1963 | Lemelson | 178/DIG. 22 |
| 3,485,946 | 12/1969 | Jackson et al. | 178/6 |
| 3,546,791 | 12/1970 | Koos et al. | 178/5.6 |

Primary Examiner—Robert L. Richardson
Assistant Examiner—Mitchell Saffian
Attorney, Agent, or Firm—Craig & Antonelli

[57] ABSTRACT

In television broadcasting, a series of special signals carrying different motionless images for different frames are repeatedly sent out, and after being converted into video signals by a receiving section of a television receiver, are applied to a selector means. The selector means picks up a video signal carrying a desired motionless image in accordance with the indication of an indicator means and sends said video signal to a displaying section, where the selected signal is converted into an image and displayed.

3 Claims, 4 Drawing Figures

INFORMATION SELECTING AND DISPLAYING APPARATUS

The present invention relates to an apparatus for selecting a signal carrying the desired information to be displayed from a series of signals containing a multiplicity of different pieces of display information and for displaying such desired information, more particularly it relates to an apparatus being useful as a teaching machine which enables programmed learning.

In the field of education, correspondence courses of education by television broadcasting and class-room education with the help of industrial television are common practice as a means of teaching a multiplicity of learners at the same time. These teaching means pass information to learners in one way without regard to how much the learners understand, making education impossible commensurate with the ability of individual learners.

A method of programmed learning using teaching machines is known as a way of teaching a multiplicity of learners in the manner suited to their individual ability. However, this method is not applicable to such a means for sending out information in one way as television and radio broadcasting.

In this connection, it is supposed that a new application of broadcasting will be developed if it is made possible to display the desired information selected by a recipient from among a multiplicity of pieces of display information which are sent out in one way.

For example, a multiplicity of images can be transmitted in a short period of time by television broadcasting if motionless images of different kinds are carried from frame to frame. In this way, it is possible to obtain the desired information, by selecting and displaying on a Braun tube one of the multiplicity of images transmitted.

It is accordingly a primary object of the present invention to provide an apparatus for selecting a signal carrying the desired information from among a series of signals containing a multiplicity of different pieces of information to be displayed, and for displaying the desired information.

Another object of the present invention is to select and use only desired pieces of display information from among a multiplicity of pieces of display information sent out by such an information transmitting means as television and radio broadcasting.

Still another object of the present invention is to make programmed learning practicable even by television and radio broadcasting which are means of one-way transmission of information.

For the purpose of achieving the above-mentioned objects, the information selecting and displaying apparatus according to the present invention comprises a transmitter means for repeatedly transmitting a series of signals carrying a multiplicity of different pieces of display information, an indicator means for indicating the desired pieces of display information from among the above-mentioned multiplicity of pieces of display information, a selector means for selecting a signal carrying the desired display information from among the series of signals in accordance with the indication of the indicator means, and a displaying means for converting into an image the signal carrying the desired display information selected by the selector means and for picturing it.

The above and other objects, features and advantages will be made apparent by the detailed description taken in conjunction with the accompanying drawings, in which.

Figure 1:
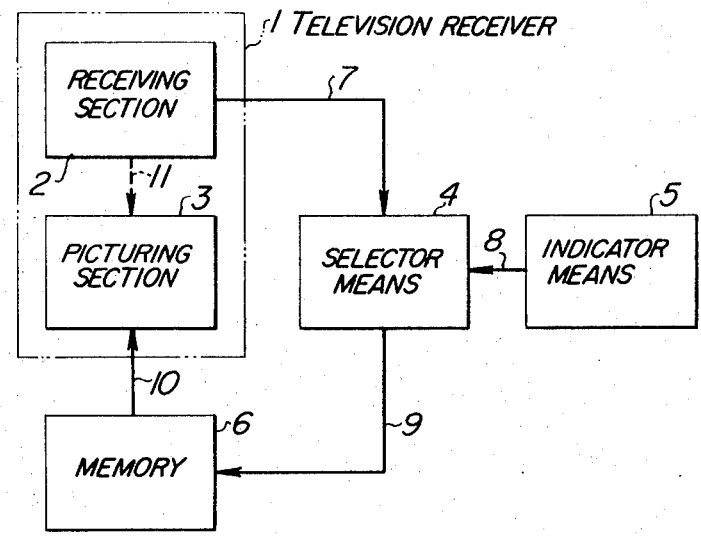
FIG. 1 is a block diagram showing an information selecting and displaying apparatus embodying the present invention.

FIG. 1 which schematically illustrates a construction of an embodiment of the present invention shows a case in which motionless images telecast are selected and pictured. In the figure, numeral 1 shows a television receiver which comprises a receiving section 2 and displaying section 3. Television waves received at the receiving section 2 are usually passed to the displaying section 3 as video signals through a signal line 11, and pictured as images on a Braun tube in the displaying section.

Numeral 4 shows a selector means which select signals carrying desired images from among video signals transmitted from the receiving section 2. Numeral 5 shows an indicator means which controls the selector means 4 by applying thereto signals indicating desired images. Further, numeral 6 shows a memory which, as is well known, includes a delay line, a magnetic disc, a magnetic drum or a video tape recorder (hereinafter referred to as a VTR) and which stores a frame of video signals.

Special television wave transmitted according to the present invention carries motionless images which vary from frame to frame. Under the current broadcasting system, 30 frames of images can be sent per second, that is, about one hundred different kinds of images can be transmitted every several seconds. Therefore, if the same images are sent for each several seconds, for example, four seconds, with a start signal superimposed on a synchronizing pulse at the start of each batch of images, a desired image is selected from the 120 images by indicating the number of frames counted from the start signal in the receiving side.

Such special images can be produced by photographing a different picture on each frame of movie film and scanning the picture with a velocity of 30 frames of film per second in a television transmitter. It is also obvious that such special images can be produced by means of a VTR.

Now, the operation of taking out the desired motionless images from the special television wave will be explained with reference to FIG. 1. Assuming that a specific channel of the television receiver 1 is assigned for the operation of the above-mentioned special television wave, adjusting a channel knob causes the television wave to be received by the receiving section 2 and converted into a video signal. This channel knob is such that a change-over switch is actuated at the time of receiving the above-mentioned wave, for example, so that the video signal is applied through a signal line 7 to the selector means 4 instead of the displaying section 3 directly through the signal line 11.

An indicating signal for indicating which image is to be selected as counted from the starting signal is sent from the indicator means 5 through the signal line 8 to the selector means 4. The selector means 4 counts the number of vertical synchronizing signals which appear after a start signal, and thereby selects and sends through the signal line 9 to the memory 6 a video signal including only the image indicated by the indicator means 5.

The memory 6 which holds a frame of video signals transmits the signals repeatedly through the signal line 10 to the displaying section 3, thereby enabling the displaying section 3 to picture the selected image. The above-mentioned memory 6 may be so constructed that the video signals stored on a delay line corresponding to one frame are repeatedly taken out, or such video signals stored on a magnetic disc or drum corresponding to one frame are repeatedly taken out. As another alternative, a VTR may be used with a stop motion for recording and reproducing operations.

If the Braun tube of the displaying section 3 retains light for long or stores information for several seconds, the above-mentioned memory 6 may be eliminated, applying directly to the displaying section 3 the video signals selected by the selector means 4. Thus, the desired images can be selected and displayed by indicating them through the control of the indicator means 5.

Although the embodiment of FIG. 1 involves a television wave, the present invention is applicable to a case in which such a wave is sent by wired broadcasting or reproduced from a VTR. In such a case, the receiving section 2 as shown in FIG. 1 may be eliminated.

Further, different motionless images may be sent out for different fields instead of different frames as in the above embodiment. In that case, the memory 6 may have a capacity to store a field of signals.

In addition to the transmission method described above with reference to the embodiment, there is also a method in which video signals per se are not sent. For example, in recent years has been seen the rapid extension of the use of display equipment as input and output devices for electronic data processing systems and data communication machines in which characters and diagrams are indicated on a cathode-ray tube or the like as visible images. The use of such display equipment makes possible the utilization of a variety of the commonly used digital signals in addition to the video signals as signals carrying different pieces of information. Such display equipment contains within it a means for producing characters and symbols, and images are generated by signals representing the types, sizes and positions of indication, of the characters and symbols. Since digital signals each with about 30 bits per character suffice as the above-mentioned signals, the amount of signals needed to produce an image can be reduced to less than one of several tens of the amount of the corresponding video signals. This makes possible the transmission of such signals by means of an intermediate or short wave or f-m broadcast wave. It is needless to say that several ten times more images can be sent by a television wave than when using video signals.

A configuration of component elements for sending images by the above-mentioned methods may include, in the embodiment of FIG. 1, an intermediate or short wave or f-m receiver and a pulse shaper instead of the receiving section 2 of the television receiver, and display equipment instead of the displaying section 3 and memory 6. However, it is an image of digital signals which are successively received that are selected by the selector means 4. Also, in place of the vertical synchronizing signal, a synchronizing signal which arrives first for each image is used.

Therefore, digital signals immediately following a synchronizing signal of a given number from a given start signal among successions of digital signals and representing a single image are selected by the selector means 4 in accordance with the indication of the indicator means 5 and applied to the display equipment, which temporarily stores the above-mentioned digital signals and, after converting them into characters or symbols, displays them as an image on a cathode-ray tube or the like.

In the case where the digital signals are produced by use of wired broadcasting or a recorder including magnetic tape instead of an electric wave, the above-mentioned receiver may be eliminated.

Figure 2:
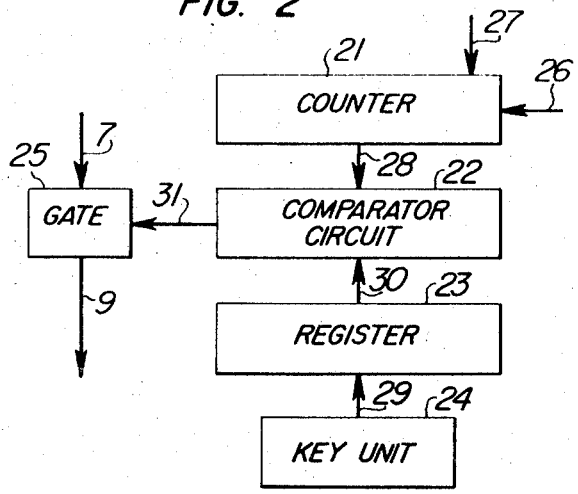
FIG. 2 is a block diagram showing an embodiment of an actual construction of a part of the apparatus as shown in FIG. 1.

FIG. 2 is a block diagram showing the construction of an embodiment of the selector means 4 and indicator means 5 as shown in FIG. 1. Numeral 21 shows a counter, 22 a comparator circuit, 23 a register, 24 a key unit and 25 a gate circuit.

Start signals separated from synchronizing signals are applied to the counter 21 through a signal line 26 for resetting the counter 21. Synchronizing signals separated from the video signals are successively applied to the first stage of the counter 21. As a result, the counter 21 counts the number of synchronizing signals which appear after application thereto of a start signal, and the resultant signal is applied through a signal line 28 to the comparator circuit 22.

On the other hand, the depression of a key on the key unit 24 indicates the number of display information, which is set in the register 23 through a signal line 29. This signal is further applied to the comparator circuit 22 through the signal line 30 for comparison with the number of bits stored in the counter 21. Only when the number of bits stored in the counter 21 agrees with that of the register 23, the comparator circuit 22 produces an output signal through the signal line 31 and opens the gate 25, sending through the signal line 9 video signals applied to the signal line 7.

When different motionless images are sent out for different frames in television broadcasting, it is necessary to multiply by two the number of a specific image (or frame) indicated by the key unit 24 and set it in the register 23, since the counter 21 indicates the number of fields which appear after a start signal. As an alternative, the number of an image set in the register 23 is left as it is, while the counter 21 is increased by one bit without comparing that bit with the bits stored in the register 23, in such a manner that two vertical synchronizing signals correspond to 1 in the register 23.

If the counter 21 is a binary counter, it is needless to say that the key unit 24 has to be so constructed that decimal numbers are converted into binary numbers to be set in the register 23. Also, the gate circuit 25 may consist of an analog switch or AND circuit. Further, the circuit for separating start signals and vertical synchronizing signals from video signals which is included in the receiving section is well known to those skilled in the art and therefore is not shown in the drawings.

The devices as shown in FIGS. 1 and 2 open a new way for the application of TV and radio broadcasting.

As an example, programmed learning by television broadcasting will be described below.

Some of a series of images contain questions and others answers. Each of the images containing questions is marked with the number of an image containing an answer to that question, while each image containing an answer indicates image numbers to which the learner proceeds when his answer is correct and wrong, respectively.

When the learner indicates, by means of the indicator means 5, an image number containing the first question, the question image is selected by the selector means 4 and pictured on the Braun tube of the displaying section 3. After solving the question, the learner indicates the expressed number of an answer image by means of the indicator means 5 thereby to picture the answer in the displaying section 3. The learner then checks his answer to see that it is correct. The answer image contains either one of different image numbers for the learner to proceed to, depending on whether he is right or wrong. By indicating one of the image number on the indicator means 5, the learner can look at a image containing explanation of the question or another question.

In this way, the learner can give himself a lesson commensurate with his ability in accordance with a learning program which might be prepared by a broadcasting station.

Figure 3:
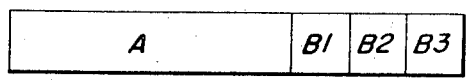
FIG. 3 is a diagram showing a composition of a series of signals carrying display information.
Figure 4:
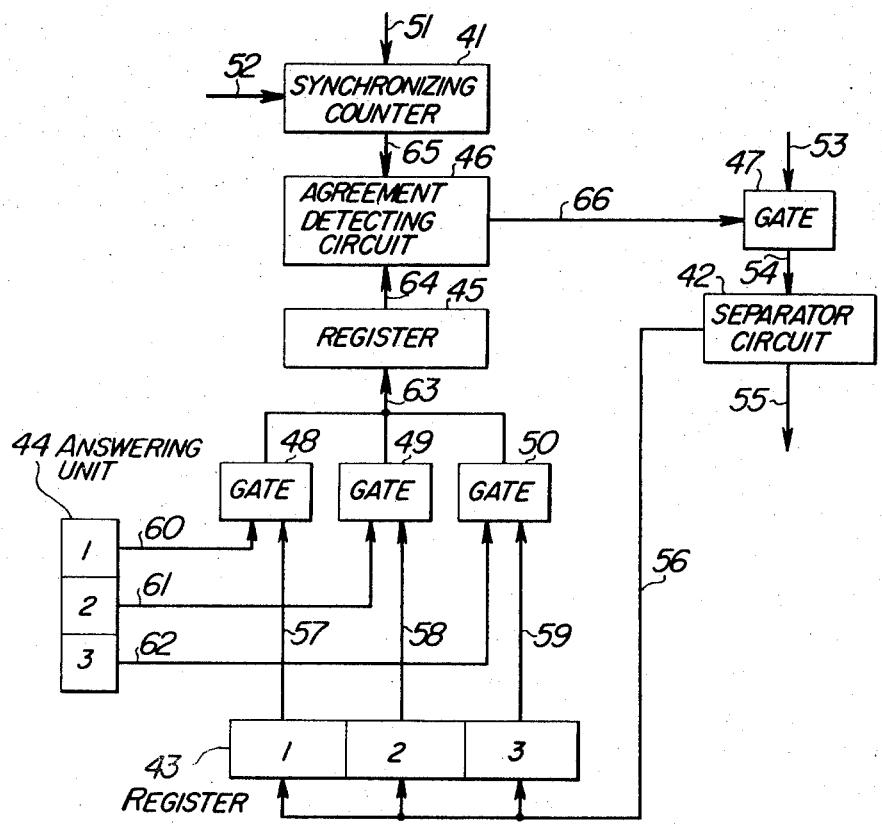
FIG. 4 is a block diagram showing another embodiment of an actual construction of a part of the apparatus as shown in FIG. 1.

Another information selecting-displaying apparatus according to the present invention is shown in FIGS. 3 and 4. FIG. 3 shows a composition of a signal carrying the display information which includes a display information signal part A, signal parts $B_1$, $B_2$ and $B_3$ carrying the number of a plurality of pieces of display information which are indicated in accordance with the learner's answer. By the way, in the case of telecasting, the signal parts $B_1$, $B_2$ and $B_3$ may be inserted in a vertical synchronizing signal. By a group of signal composed of as shown in FIG. 3 made up are a series of signals which are repeatedly produced.

At the start of each series of signals, a start signal is inserted as mentioned before, and it is needless to say that a synchronizing signal is inserted before each signal following the start signal.

The display information signal part A consists of a video signal in the case of a television receiver, and a digital signal showing the type, size and position of indication, of a character or symbol in the case of a displaying equipment.

FIG. 4 shows a part of the information selecting-displaying apparatus which selects and displays a received signal of such a composition, and corresponds to the selector means 4 and indicator means 5 of FIG. 1. In FIG. 4, numeral 41 shows a synchronizing counter for counting the number of synchronizing signals, numeral 42 a separator circuit for separating the information signal part A and display information number signals $B_1$, $B_2$ and $B_3$ from each other, numeral 43 a register for storing the display information number signals parts $B_1$, $B_2$ and $B_3$, numeral 44 an answering unit having three buttons 1, 2 and 3, numeral 45 a register for storing the information number signal part $B_1$, $B_2$ or $B_3$ selected, numeral 46 an agreement-detecting circuit for detecting the agreement between the counter 41 and register 45 in the bits stored therein, numerals 47 to 50 gate circuits, and numerals 51 to 66 signal lines.

In the above-mentioned circuit arrangement, when a series of signals comprising the plurality of signals as shown in FIG. 3 are received by the receiving section 2 of FIG. 1, the separator circuit separates the synchronizing signal, start signal, and display information signal part and display information number signal parts from each other, which are sent out to the signal lines 51, 52 and 53, respectively.

The counter 41 is reset by a start signal from the signal line 52 and then counts synchronizing signals sent from the signal line 51. Since a synchronizing signal is generated for each piece of the display information, the counter 41 stores the number as to which piece of display information as counted from a start signal is now being transmitted, namely, the number of the display information at present being sent.

On the other hand, the register 45 is reset at the same time that the power is supplied, and hence when the counter 41 is reset by a start signal, an output is produced on the signal line 66 from the agreement detecting circuit 46 thereby to open the gate 47. As a result, a first display information signal containing a display information signal part and display information number signal parts following a start signal are applied from the signal line 54 to the separator circuit 42, where the display information signal part and display information number signal parts are separated from each other and stored in the memory 6 and register 43 respectively through the signal lines 55 and 56. The register 43 includes three independent register sections 1, 2 and 3 which respectively store display information number signal parts corresponding to the buttons 1, 2 and 3 of the answering unit 44. When a second display information is received on completion of reception of the first display information, a synchronizing signal inserted before the second display information is counted. If the counter 41 and register 45 disagree with each other in the bits stored, the output from the agreement detecting circuit 46 is stopped and the gate 47 is closed. Then neither the display information signal part nor the display information number signal parts is applied to the separator circuit 42.

On the other hand, the display information signal part stored in the memory 6 of FIG. 1 is displayed as an image on the displaying section 3. The learner looks at the display information thus displayed and depresses the button 1, 2 or 3 of the answering unit 44. The output which is produced by the depression of the respective buttons is applied through the signal lines 60, 61 or 62 to the gate 48, 49 or 50 respectively to open a corresponding one of them. Meanwhile, the outputs of the register sections 1, 2 and 3 of the register 43 are applied through the signal lines 57, 58 and 59 to the gates 48, 49 and 50, respectively. Therefore, depressing a button on the answering unit 44 causes a corresponding gate to be opened and the register section output applied to the gate is stored in the register 45 through the signal line 63.

For example, depressing the button 2 of the answering unit 44 causes the gate 49 to be opened and the bits stored in the register 2 of the register 43 are sent to the register 45 through the signal lines 58 and 63. In other words, the number of the display information to be displayed next is selected and stored in the register 45 at the mere depression one of three buttons on the answering unit 44.

The outputs of the register 45 and counter 41 are applied through the signal lines 64 and 65 respectively to the agreement detecting circuit 46 where the bits stored in them are compared with each other.

Synchronizing signals which successively come in together with the display information are counted, and when the number of the synchronizing signals agrees with the number of the information to be displayed next stored in the register 45, that is to say, when a signal carrying the display information corresponding to the number designated by the register 45 is received, an output is produced from the agreement detecting circuit 46 and the gate 47 is opened, so that the signal carrying the display information and the one carrying the number of the display information to be displayed next are stored in the memory 6 of FIG. 1 any register 43 respectively and the display information in the memory 6 is displayed as images on the displaying section 3 of FIG. 1. The operation described above is repeated.

An example of programmed learning by telecasting by use of the apparatus as shown in FIG. 4 will be described below.

The display information signal part A as shown in FIG. 3 includes image signals carrying different questions or hints, while signal parts $B_1$, $B_2$ and $B_3$ include image numbers to be indicated in accordance with the learner's answer to the question or hint included in each of the display information signal A.

The first display information following a start signal which, as mentioned above, is first displayed comprises a question image. The learner looks at this displayed question image and, selecting one of a plurality of answers (three in this case) which he thinks that it is correct, depresses the button 1, 2 or 3 of the answering unit 44. The resulting output is applied to the gate 48, 49 or 50 respectively thereby to open a corresponding gate.

On the other hand, image numbers to be indicated in accordance with the learner's answer are stored in the register sections 1, 2 and 3 of the register 43, and an image number in accordance with an answer from the answering unit 44 is stored in the register 45 through the gate circuit. The image number in the register 45 and the number of the synchronizing signals in the counter 41 are compared with each other by the agreement detecting circuit 46. When the image number agrees with the number of the synchronizing signals, gate 47 is opened so that the image signal corresponding to the image number stored in the register 45 is fed to and stored in the memory 6 of FIG. 1, which can therefore be displayed in the next place.

On account of this the learner can study in accordance with his ability, if different texts next to be worked on in accordance with the learner's answer are prepared and the numbers of the pieces of display information displaying the next texts are added to the display information signals, respectively, so as to be capable of automatically informing the learner of the next text in the display information previously displayed in accordance with the learner's answer.

Further, the answering unit 44 serves the purpose only if it includes buttons in the same number as answers, together with the accompanying register 45, gate circuits 48, 49 and 50, thereby simplifying the apparatus greatly in comparison with an indicator means in which a display information number is indicated for the generation of a signal carrying the display information number.

Moreover, the apparatus according to the present invention has a feature that its operation is quite easy because it suffices to depress only a button among a plurality of buttons on the answering unit 44.

It is needless to say that the present invention is not limited to the above-mentioned embodiments but finds application in a variety of modifications.

What is claimed is:

1. An information selecting and displaying apparatus comprising:

transmitter means for repeatedly sending out a series of signals carrying a multiplicity of different pieces of display information, said series of signals including a start signal inserted at the start thereof, each of said signals carrying a piece of display information including a display information signal part and a plurality of number signal parts representing the numbers of predetermined ones of said series of signals carrying predetermined ones of said multiplicity of pieces of display information and including a synchronizing signal;

receiver means for receiving said series of signals and separating said start signal and said synchronizing signals from said series of signals;

counter means, connected to said receiver means, for counting the number of said synchronizing signals appearing after said start signal;

first gate means, connected to said receiver means, for selecting a signal carrying a desired piece of display information from among said series of signals;

separator means, connected to said first gate means, for separating said number signal parts from said signal selected by said first gate means;

first register means, connected to said separator means, for storing said numbers represented by said number signal parts;

displaying means, connected to said separator means, for displaying the display information signal part contained in said selected signal;

answering means for allowing alternative answers to be given to said displayed information on said displaying means;

second gate means, connected to said first register means and said answering means, for selecting one of said numbers in said first register means in accordance with an answer by said answering means;

second register means, connected to said second gate means, for storing said number selected by said second gate means; and comparator means, connected to said counter means and said second register means, for comparing the number in said counter means with the number in said second register means to produce a coincident signal to be applied to said first gate means for operating said first gate means.

2. An information selecting and displaying apparatus according to claim 1, further comprising memory means connected between said separator means and said displaying means for storing the signal carrying said desired piece of display information selected by said first gate means and repeatedly sending said signal to said displaying means.

3. An information selecting and displaying apparatus according to claim 1, in which said transmitter means comprises means for transmitting a broadcast wave corresponding to said series of signals to said receiver means.

* * * * *